United States Patent
Nimura et al.

(10) Patent No.: US 6,675,275 B2
(45) Date of Patent: Jan. 6, 2004

(54) COMPUTER SYSTEM CONTROLLING MEMORY ALLOCATION

(75) Inventors: Kazuaki Nimura, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 09/957,068

(22) Filed: Sep. 21, 2001

(65) Prior Publication Data

US 2002/0188818 A1 Dec. 12, 2002

(30) Foreign Application Priority Data

Jun. 6, 2001 (JP) .................................... 2001-170830

(51) Int. Cl.⁷ ............................................. G06F 12/00
(52) U.S. Cl. .................... 711/170; 711/154; 713/1; 713/2; 713/100; 710/10; 710/104
(58) Field of Search ............................ 369/30.01, 34.01, 369/35.01, 127; 710/8, 10, 104, 300; 711/147, 154, 170, 171, 172, 173; 713/1, 2, 100

(56) References Cited

U.S. PATENT DOCUMENTS

| | | | | |
|---|---|---|---|---|
| 5,077,737 A | * | 12/1991 | Leger et al. | 714/6 |
| 5,349,661 A | * | 9/1994 | Brewer et al. | 713/1 |
| 5,446,898 A | * | 8/1995 | Bealkowski et al. | 713/1 |
| 5,671,413 A | * | 9/1997 | Shipman et al. | 713/2 |
| 5,887,165 A | * | 3/1999 | Martel et al. | 713/100 |
| 6,266,724 B1 | * | 7/2001 | Harari et al. | 710/301 |
| 2001/0001146 A1 | * | 5/2001 | Petersen | 705/26 |

FOREIGN PATENT DOCUMENTS

| | | |
|---|---|---|
| JP | HEI 01-282645 | 11/1989 |
| JP | HEI 06-348584 | 12/1994 |
| JP | HEI 07-334373 | 12/1995 |

* cited by examiner

*Primary Examiner*—Donald Sparks
*Assistant Examiner*—C. P. Chace
(74) *Attorney, Agent, or Firm*—Staas & Halsey LLP (57) ABSTRACT

A computer system for CPU command conversion or real-time compilation with excellent performance. A part of a memory is operated as a special memory area for CPU command conversion or for real-time compilation. The computer system includes: a CPU; a memory; a memory controller for controlling the memory; a chip set; a ROM; a special memory setting table for setting a memory capacity to be mounted, and a capacity setting value of the special memory area corresponding to the capacity setting value of the special memory area corresponding to the capacity of each memory capacity; and a special memory area setting unit for reading the capacity setting value of the special memory area corresponding to the capacity of all the mounted memories from the special memory setting table at the time of starting, and then setting the special memory area.

7 Claims, 8 Drawing Sheets

| TOTAL MEMORY | SET VALUE |
|---|---|
| 16MB | 8MB |
| 32MB | 16MB |
| 64MB | 16MB |
| 128MB | 16MB |
| 256MB | 32MB |

COMPUTER SYSTEM CONTROLLING MEMORY ALLOCATION

BACKGROUND OF THE INVENTION

1. Field of the Invention

The present invention relates to a computer system, which operates a part of a memory as a special memory area for CPU command conversion or real-time compilation.

2. Description of the Related Art

In a conventional computer system, a CPU itself does not use a special random access memory (RAM) area, and therefore the memory is not allocated dynamically.

Among recently developed computer systems, to achieve compatibility with an existing chip, there is one using a CPU, which has a memory area only for emulation. However, even in such a computer system, no changing or the like of the memory area from its initial set value has been executed.

With regard to such a conventional computer system, there have been provided no computer systems, which include functions to change the capacity of an emulation only memory area from its initial value, nor any functions have been provided to enable a user to change the capacity of the special memory area.

In addition, the capacity of the emulation only memory area is not changed even when the memory area used by an operating system, an application program, and so on, has enough capacity. Thus, although it is possible to increase the capacity of the memory area used by the operating system, the application program, and so on, by extending memory, a memory area only for CPU command conversion or for real-time compilation can not be increased. Consequently, it is impossible to improve performance of the CPU or the computer system in this case.

The present invention was made with the foregoing problems in mind, and it is an object of the present invention to provide a computer system operated with excellent performance for CPU command conversion or real-time compilation.

SUMMARY OF THE INVENTION

In order to achieve the foregoing object, in accordance with a first aspect of the present invention, there is provided a computer system for operating a part of a memory as a special memory area for CPU command conversion or real-time compilation, comprising: a CPU; a memory; a memory controller for controlling the memory; a special memory setting table for setting a plurality of memory capacities to be mounted in the computer system, and a capacity setting value of the special memory area corresponding to each of the plurality of memory capacities; and a special memory area setting unit for reading a capacity setting value of the special memory area corresponding to all the memory capacities mounted in the computer system from the special memory setting table at starting time of the computer system, and then setting a special memory area based on the capacity setting value.

According to the computer system in the first aspect of the present invention, the presence of the special memory setting table and special memory area setting unit enables a special memory area to be set based on a pre-optimized capacity setting value, and the computer system to be operated with optimal performance.

In order to achieve the foregoing object, in accordance with a second aspect of the present invention, there is provided a computer system for operating a part of a memory as a special memory area for CPU command conversion or real-time compilation, comprising: a CPU; a memory; a memory controller for controlling the memory; a calculating formula storage unit for storing a formula for calculating a capacity of the special memory area corresponding to a memory capacity, from the memory capacity mounted in the computer system; and a special memory area setting unit for setting a capacity of the special memory area of the computer system based on the calculating formula stored in the calculating formula storage unit at starting time of the computer system.

According to the computer system in the second aspect of the present invention, the presence of the calculating formula storage unit and the special memory area setting unit eliminates the necessity of setting a pre-optimized capacity setting value, and enables a special memory area to be automatically set based on a capacity setting value obtained by optimization calculation carried out based on a mounted memory capacity, and the computer system to be operated with optimal performance.

In order to achieve the foregoing object, in accordance with a third aspect of the invention, there is provided a computer system for operating a part of a memory as a special memory area for CPU command conversion or real-time compilation, comprising: a CPU; a memory; a memory controller for controlling the memory; and a special memory area setting unit including a software interface for setting a capacity setting value of the special memory area based on an operation executed by an operator.

According to the computer system in the third aspect of the present invention, the presence of the special memory area setting unit enables a special memory area to be set based on an optimal capacity setting value, by the operation at the application program level on the operating system, to which the operator is accustomed, and the computer system to be operated with optimal performance.

In order to achieve the foregoing object, in accordance with a fourth aspect of the invention, there is provided a computer system for operating a part of a memory as a special memory area for CPU command conversion or real-time compilation, comprising: a CPU; a memory; a memory controller for controlling the memory; a memory use state monitoring unit for monitoring a use state of the memory by a user; and a special memory area setting unit for setting a capacity of the special memory area based on a monitoring result of the memory use state by the memory use state monitoring unit.

According to the computer system in the fourth aspect of the present invention, the presence of the memory use state monitoring unit and the special memory area setting unit enables an optimal capacity value of the special memory area to be automatically set dynamically based on a memory use state without any needs for the user to care about the setting of the special memory area, and the computer system to be operated with optimal performance.

In this case, preferably, the computer system further comprises, in addition to a first memory area used in a fixed manner as the special memory area, a second memory area set as the special memory area, or released from the setting, and the special memory area setting unit sets the second memory area as the special memory area, or releases the setting.

Thus, the number of places for setting special memory areas is not limited to one, but any can be set, and an area, setting thereof having been released, can be used as a general purpose memory area.

Preferably, the computer system of the present invention further comprises a register for regulating a range of the second memory area set by the special memory area setting unit, and access inhibiting means for inhibiting access to the second memory area set as the special memory area setting unit for purposes other than CPU command conversion or real-time compilation.

Thus, it is possible to prevent any erroneous operations caused by fraudulent access to the second memory area.

Furthermore, in the computer system of the present invention, preferably, the special memory area setting unit obtains a part of a memory area used by an operating system or an application program, and assigns the obtained part as the special memory area.

Thus, without limiting only to a fixed area as the second memory area, the general purpose memory area can be flexibly used as the second memory area.

DESCRIPTION OF THE PREFERRED EMBODIMENTS

Next, the preferred embodiments of the present invention will be described.

First, description will be made of the hardware configuration of a computer system according to each embodiment of the present invention.

Figure 1:
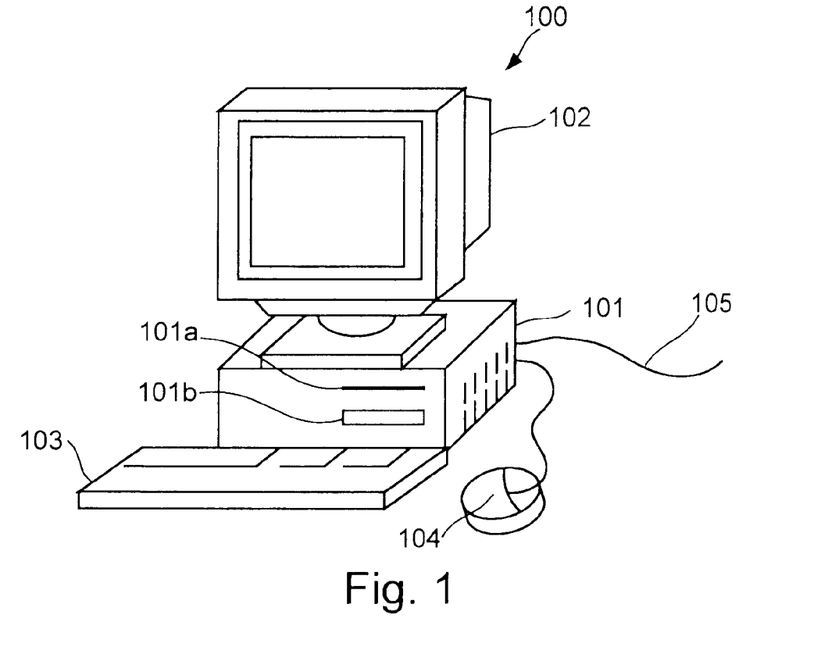
FIG. 1 is an appearance view of a computer system according to a first embodiment of the present invention.

FIG. 1 is an appearance view of a computer system according to the first embodiment of the present invention.

As shown in FIG. 1, this computer system 100 comprises: a main body 101 incorporating a central processing unit (CPU), memories (RAM and ROM), a hard disk, and a communication board, and so on; a CRT display 102 for performing screen displaying based on an instruction from the main body 101; a keyboard 103 for entering a user instruction or character information into the computer; a mouse 104 for specifying a given position on the screen of the CRT display 102, and then entering an instruction according to the specified position; and a communication cable 105 for connecting this computer with other computers.

The main body 101 includes floppy disk and CD-ROM insertion ports 101a and 101b, through which a floppy disk and a CD-ROM are freely taken out or inserted, and incorporates floppy disk and CD-ROM drives respectively for driving a floppy disk and a CD-ROM inserted inside.

For the computer system 100, one generally called a workstation or a personal computer can be used.

Figure 2:
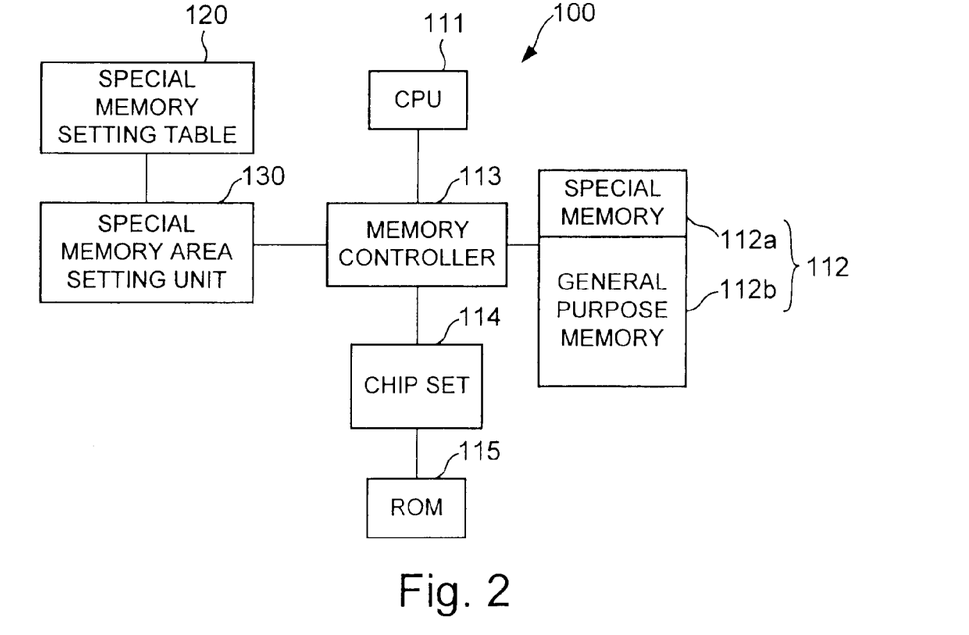
FIG. 2 is a block diagram showing the inside of the computer system of the first embodiment.

FIG. 2 is a block diagram showing the inside of the computer system of the first embodiment of the present invention.

This computer system 100 comprises: a central processing unit (CPU) 111; a memory 112; a memory controller 113 for controlling the memory 112; a chip set 114; and a read-only memory (ROM) 115, and operates a part of the memory 112 as a special memory area 112a for command conversion of the CPU 111 or real-time compilation. This computer system 100 also comprises: a special memory setting table 120 for setting a plurality of memory capacities to be mounted and a capacity setting value of the special memory area 112a corresponding to each of the plurality of memory capacities; and a special memory area setting unit 130 for reading, from the special memory setting table 120, the capacity setting value of the special memory area 112a corresponding to the capacity of all the memories 112 mounted in the computer system 100 at the starting time thereof, and then setting a special memory area 112a based on the capacity setting value.

For the memory 112, a part of the memory is set as a special memory area 112a for CPU command conversion or real-time compilation. An area other than the special memory area 112a is used as a general-purpose memory area 112b for a general operating system or an application program.

Next, a BIOS setup screen used in the first embodiment of the present invention will be described. The first embodiment of the present invention corresponds to the computer system of the first aspect of the present invention described above.

Figure 3:
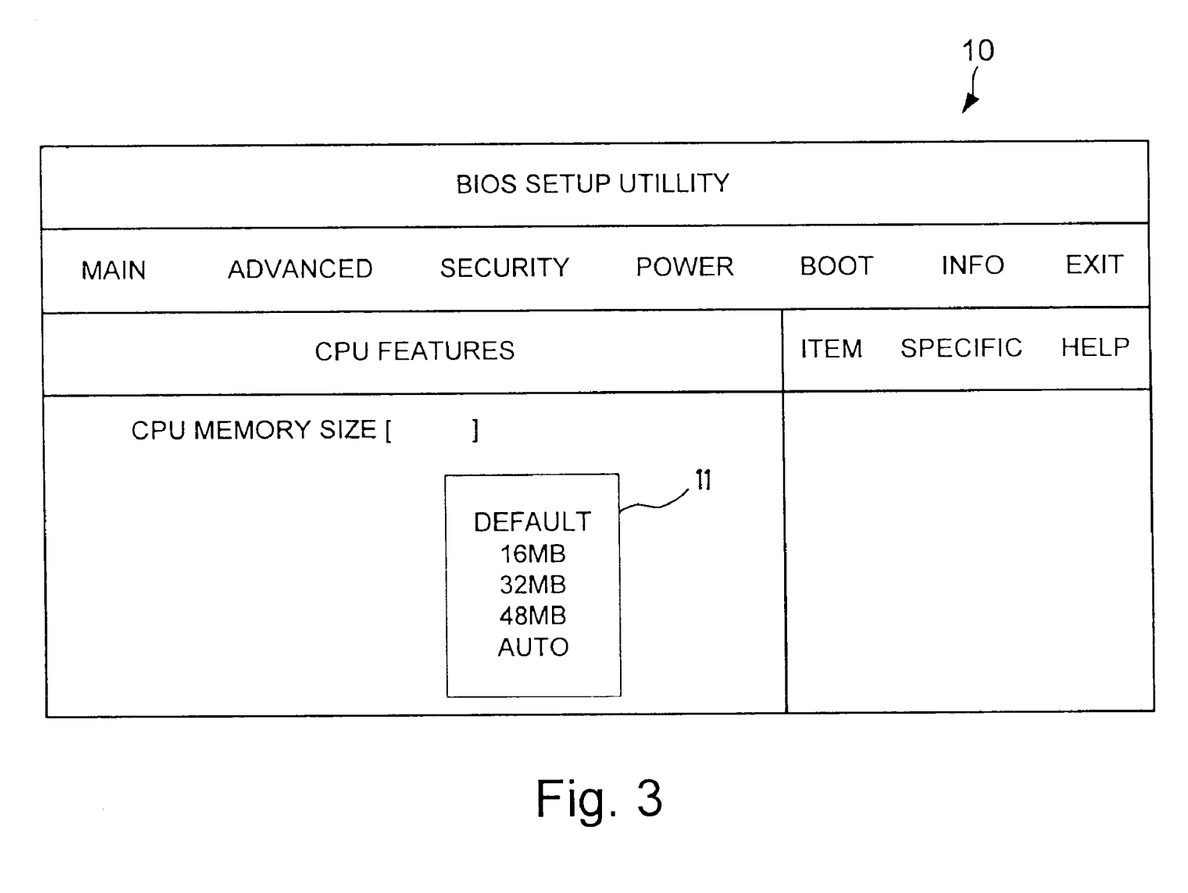
FIG. 3 is a view showing a BIOS setup screen used for each embodiment of the present invention.

FIG. 3 is a view showing a BIOS setup screen used in each embodiment of the present invention.

FIG. 3 shows a basic I-O system (BIOS) setup screen used in the embodiment.

In the computer system of the present invention, when a BIOS setup utility is started, a BIOS setup screen 10 like that shown in FIG. 3 is displayed on the screen, and a CPU memory size and other parameters are set by using this BIOS setup screen 10.

For the CPU memory size, optional one can be selected from user setting values, e.g., "Default, 16MB, 32MB, 48MB, Auto", and so on, displayed in a CPU memory size setting area 11 in the BIOS setup screen 10.

In the CPU memory size setting area 11, when "Auto" is selected as a user setting value, special memory area setting is executed in the computer system of the first embodiment.

Figure 4:
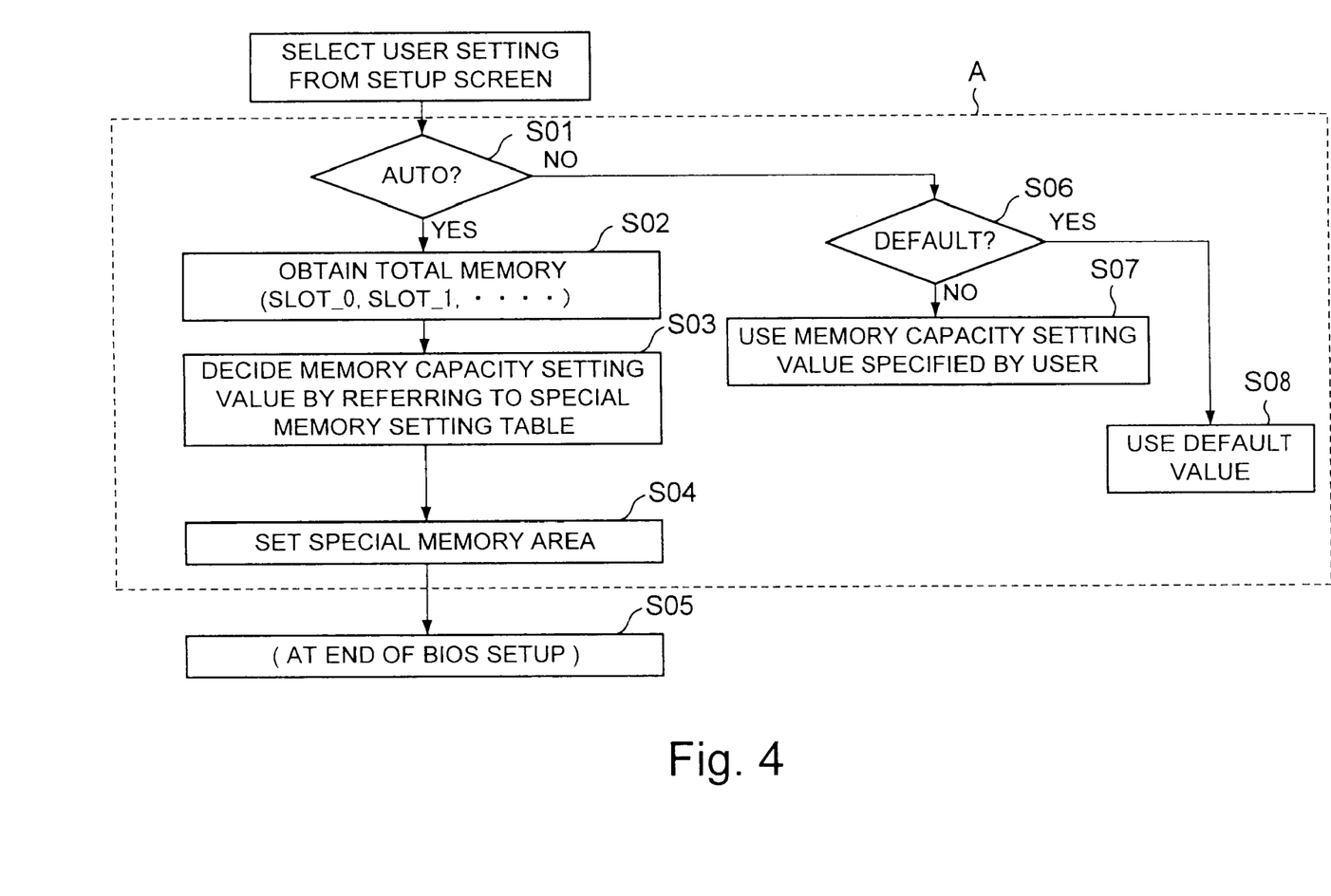
FIG. 4 is a flowchart of setting a capacity of a special memory area in the first embodiment.

FIG. 4 is a flowchart of the capacity setting of the special memory area in the first embodiment.

As shown in FIG. 4, first, the user setting value is checked (step S01) and, if the user setting value is "Auto", a total memory capacity to be mounted in the computer system is obtained (step S02). The acquisition of this total memory capacity is executed for all the memory loading slots mounted in the computer system: Slot_0, Slot_1, and so on.

Then, the capacity setting value stored in the special memory setting table 120 (see FIG. 2) is read by the special memory area setting unit 130 (see FIG. 2).

Figure 5:
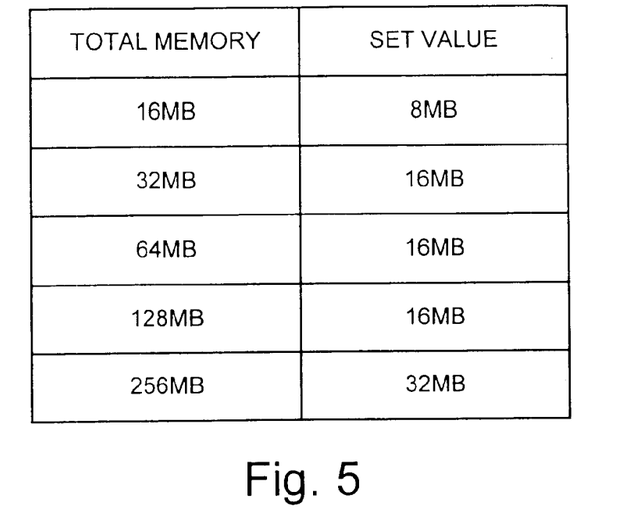
FIG. 5 is a view showing an example of a special memory setting table in the first embodiment.

FIG. 5 shows an example of the special memory setting table in the first embodiment.

As shown in FIG. 5, the special memory setting table 120 stores a total memory capacity 121 of 5 stages from 16MB to 256MB to be mounted in the computer system, and a capacity setting value 122 of the special memory area of 5 stages from 8MB to 32MB corresponding to the total memory capacity, obtained beforehand from the result of evaluation based on a relation between the total memory capacity and the capacity of the special memory area. An optimal value obtained beforehand is set, for example, the capacity setting value 122 is 8MB when the total memory capacity 121 is 16MB, and the capacity setting value 122 is 16MB when the total memory capacity 121 is 32MB.

Turning back to the flowchart of FIG. 4, the special memory area setting unit 130 (see FIG. 2) returns an optimal capacity setting value of the special memory area corresponding to the total memory capacity at present by referring to the special memory setting table 120 (step S03).

The special memory area setting unit 130 sets a special memory area based on the capacity setting value (step S04). Then, resetting is executed when the BIOS setting-up is finished, and the computer system is restarted (step S05).

Information regarding the special memory area thus set is stored in the memory of BIOS, and the special memory area of the same capacity setting value is secured until BIOS setting-up is executed again.

On the other hand, as shown in FIG. 4, when the user setting value is not "Auto" in the determination of step S01, the process proceeds to step S06, where determination is made as to whether the user setting value is "Default" or not.

When the user setting value is not "Default" in the determination of step S06, a capacity setting value set by the user is employed (step S07). If the user setting value is "Default", then a preset capacity setting value of the system Default is employed (step S08).

Then, the process proceeds to step S04, where the special memory area setting unit 130 sets a special memory area based on the capacity setting value. Then, the above setting becomes valid by reset issuance when the BIOS setting-up is finished, and restarting of the computer system is executed (step S05).

Next, the second embodiment of the present invention will be described.

The second embodiment corresponds to the computer system of the second aspect of the present invention described above.

Figure 6:
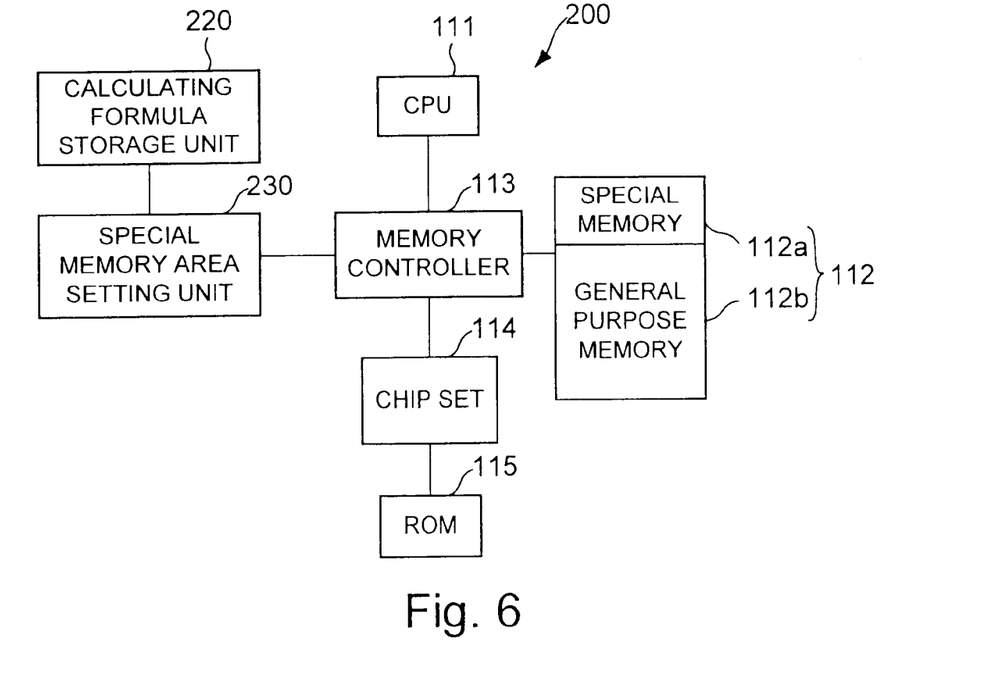
FIG. 6 is a block diagram showing the inside of a computer system according to a second embodiment of the present invention.

FIG. 6 is a block diagram showing the inside of a computer system according to the second embodiment of the present invention.

This computer system 200 comprises: a central processing unit (CPU) 111; a memory 112; a memory controller 113 for controlling the memory 112; a chip set 114; and a read-only memory (ROM) 115, and operates a part of memory 112 as a special memory area 112a for command conversion of the CPU111 or real-time compilation. The computer system 200 also comprises: a calculating formula storage unit 220 for storing a calculating formula for calculating, from a memory capacity mounted in the computer system, a capacity of the special memory area 112a corresponding to the memory capacity; and a special memory area setting unit 230 for setting a capacity of the special memory area 112a of the computer system based on the calculating formula stored in the calculating formula storage unit 220 at the time of starting the computer system.

A part of the memory 112 is set as a special memory area 112a for CPU command conversion or real-time compilation. An area other than the special memory area 112a is used as a general-purpose memory area 112b for a general operating system or an application program.

Figure 7:
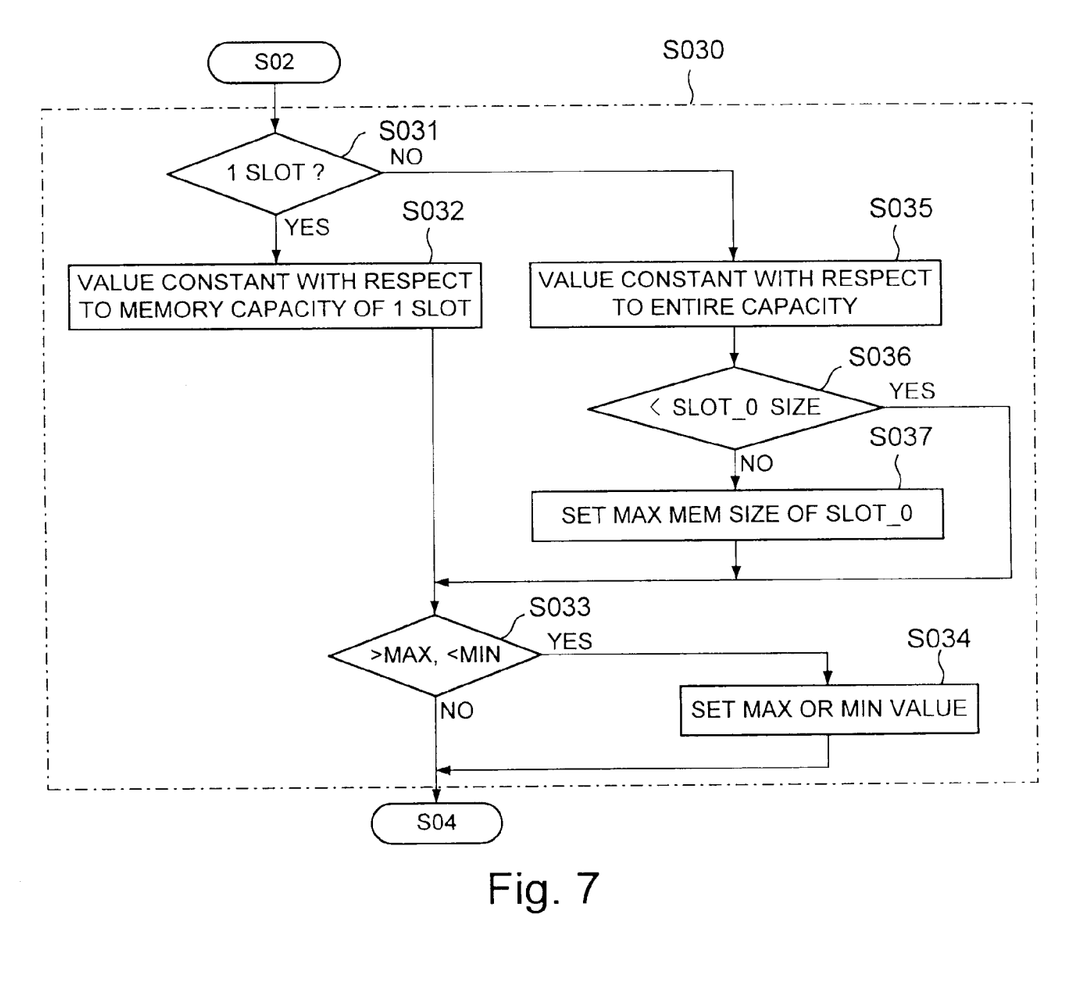
FIG. 7 is a flowchart of setting a capacity of a special memory area in the second embodiment.

FIG. 7 is a flowchart of the capacity setting of the special memory area in the second embodiment.

FIG. 7 shows only step S030 of the flowchart of the second embodiment. Step S03 (deciding a memory capacity setting value by referring to the special memory setting table) of the flowchart shown in FIG. 4 is replaced by step S030 of FIG. 7 to realize the entire flowchart of the second embodiment. Hereinbelow, description will continue with reference to FIGS. 4 and 7.

As shown in FIG. 4, first, checking is made as to a user setting value (step S01) and, if the user setting value is "Auto", a total memory capacity mounted in the computer system is obtained (step S02). The acquisition of the total memory capacity is carried out for all the memory loading slots mounted in the computer system.

Then, as shown in FIG. 7, determination is made as to whether the number of memory loading slots is one or not (step S031).

If the result of determination of step S031 shows that the number of slots is one, then a capacity setting value is calculated by an operation carried out based on a constant ratio value with respect to the memory capacity of one slot (step S032). Then, determination is made as to whether the capacity setting value is equal to/higher than a predetermined permissible maximum value Max, alternatively whether the capacity setting value is equal to/lower than a predetermined permissible minimum value Min (normally 8MB) (step S033).

If the result of determination of step S033 shows that the capacity setting value is equal to/higher than the predetermined permissible maximum value Max, then the permissible maximum value Max is substituted for the capacity setting value. If the capacity setting value is equal to/lower than the predetermined minimum value Min, then the permissible minimum value Min is substituted for the capacity setting value (step S034), and the process proceeds to step S04. If the result of determination of step S033 shows that the capacity setting value is neither equal to/higher than the predetermined permissible maximum value Max nor equal to/lower than the predetermined permissible minimum value Min, then the process directly proceeds to step S04.

On the other hand, if the result of determination of step S031 shows that the number of slots is not one, a capacity setting value is calculated by an operation carried out based on a constant ratio value with respect to the total memory capacity (step S035). Then, determination is made as to whether the computer system is composed of only a basic memory or not (step S036). If the result of determination shows that the computer system is composed of only the basic memory, then the process directly proceeds to step S033. If the result of determination shows that the computer system is composed not only of the basic memory but also an extension memory, then the process sets the capacity setting value to a predetermined maximum value Max mem size of the basic memory (step S037), and proceeds to step S033.

Next, the third embodiment of the present invention will be described.

The third embodiment corresponds to the computer system of the third aspect of the present invention.

Figure 8:
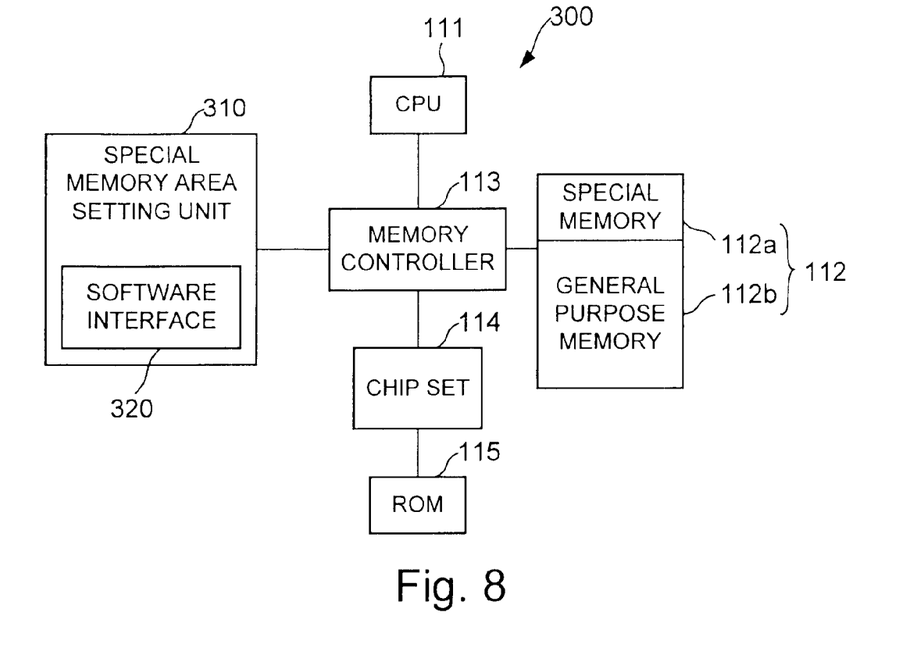
FIG. 8 is a block diagram showing the inside of a computer system according to a third embodiment of the present invention.

FIG. 8 is a block diagram showing the inside of a computer system according to the third embodiment of the present invention.

This computer system 300 comprises: a central processing unit (CPU) 111; a memory 112; a memory controller 113 for controlling the memory 112; a chip set 114; and a read-only memory (ROM) 115, and operates a part of memory 112 as a special memory area 112a for command conversion of the CPU 111 or real-time compilation. The computer system 300 also comprises a special memory area setting unit 310 including a software interface 320 for setting a capacity setting value of the special memory area 112a based on an operation performed by an operator.

A part of the memory 112 is set as a special memory area 112a for CPU command conversion or for real-time compilation. An area other than the special memory area 112a is used as a general-purpose memory area 112b for a general operating system or an application program.

In each of the first and second embodiments, the capacity of the special memory area is set at the time of setting-up the BIOS. However, such capacity setting based on the BIOS setting-up places a limit on operational convenience.

According to the third embodiment, computer system comprises the special memory area setting unit 310 including the software interface 320 for setting a capacity setting value of the special memory area based on the operation by the operator, in order to set the capacity of the special memory area in a BIOS program. Accordingly, it is possible to set the capacity of the special memory area from an operating system or an application program, which the user usually uses.

Specifically, parameter setting is performed on the BIOS setup screen of FIG. 3 at the application program level using GUI on the operating system, which the user is accustomed to, and the result thereof is set through the software interface 320 prepared by the BIOS program. In the BIOS program, by executing a part A enclosed with a broken line in the flowchart FIG. 4 through the software interface 320, the special memory area is set according to the setting of capacity described above with reference to the first and second embodiments.

Next, the fourth embodiment of the invention will be described.

The fourth embodiment corresponds to the computer system of the fourth aspect of the present invention.

Figure 9:
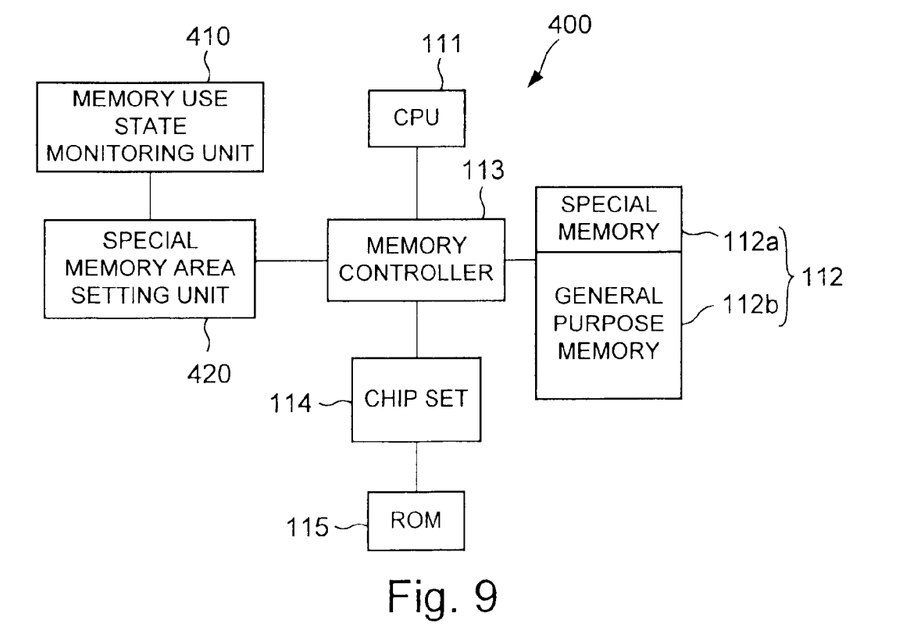
FIG. 9 is a block diagram showing the inside of a computer system according to a fourth embodiment of the present invention.

FIG. 9 is a block diagram showing the inside of a computer system according to the fourth embodiment of the present invention.

This computer system 400 comprises: a central processing unit (CPU) 111; a memory 112; a memory controller 113 for controlling the memory 112; a chip set 114; and a read-only memory (ROM) 115, and operates a part of memory 112 as a special memory area 112a for command conversion of the CPU 111 or real-time compilation. The computer system also comprises: a memory use state monitoring unit 410 for monitoring the use state of the memory by a user; and a special memory area setting part 420 for setting a capacity of the special memory area 112a based on the monitoring result of the memory use state by the memory use state monitoring unit 410.

A part of the memory 112 is set as a special memory area 112a for CPU command conversion or real-time compilation. An area other than the special memory area 112a is used as a general-purpose memory area 112b for a general operating system or an application program.

According to the fourth embodiment, the memory use state monitoring unit 410 monitors the use state of the memory by the user, and stores the result thereof. Then, when the computer system is restarted, a capacity of the special memory area 112a is decided based on the memory use state, and the capacity of the special memory area 112a is set by using the software interface described above with reference to the third embodiment.

Each of the embodiments has been described by way of example, where only a predetermined area in all the memories is set as a special memory area. However, the invention is not limited to the described example, and a computer system having an embodiment below may be provided.

That is, the computer system may comprise, in addition to a first memory area used in a fixed manner as a special memory area, a second memory area set as a special memory area or released from such setting, and the special memory area setting unit may include a CPU function for setting the second memory area as a special memory area or releasing the setting.

Figure 10:
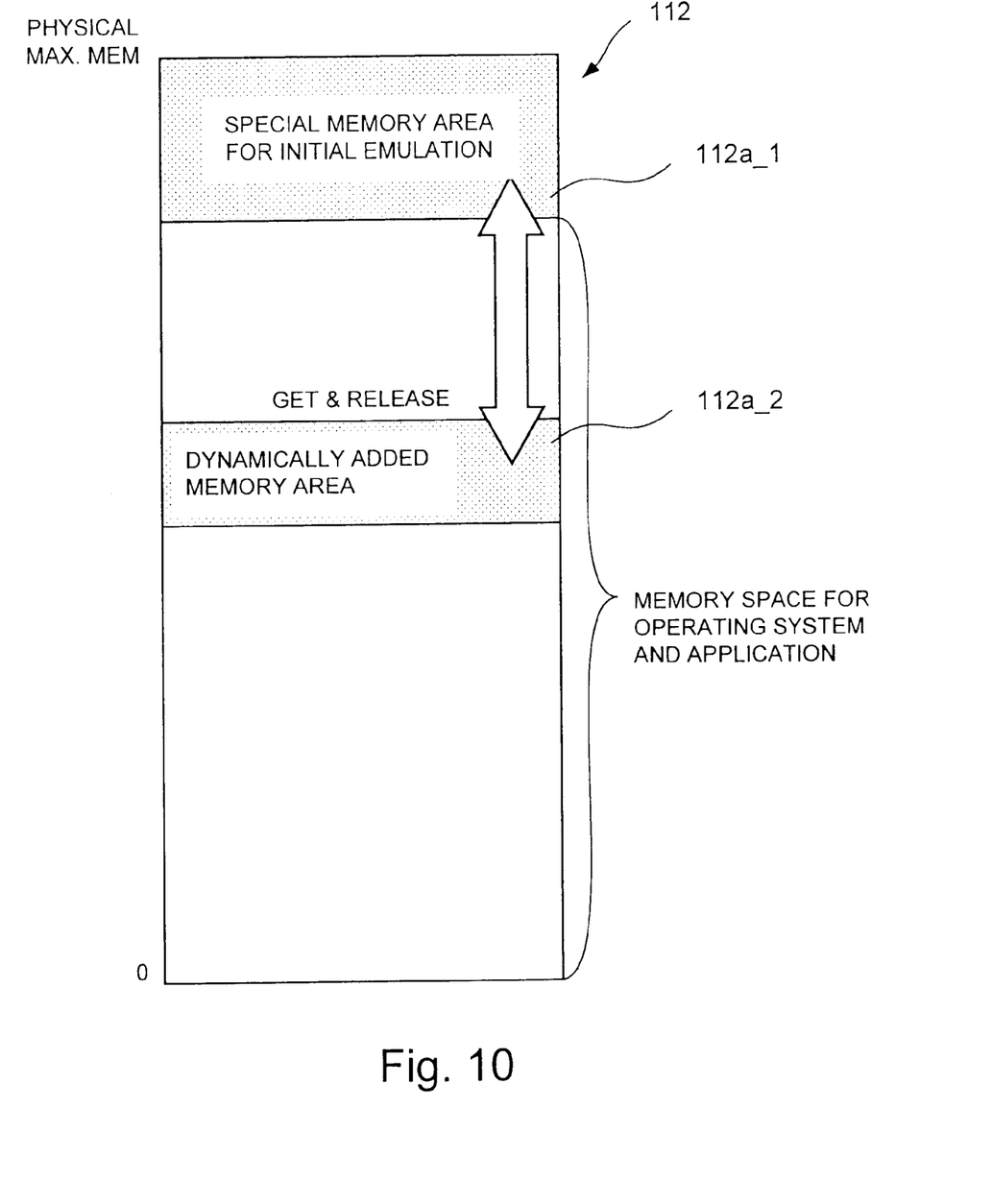
FIG. 10 is a view showing a memory map including, as special memory areas, a second memory area setting in addition to a first memory area.

FIG. 10 shows a memory map, where, the second memory area is set as a special memory area in addition to the first memory area.

As shown in FIG. 10, in the memory 112, in addition to a memory area 112a_1 only for emulation initialized as the first special memory area, a special memory area 112a_2 dynamically added as the second special memory area is set. This second special memory area 112a_2 can not only be added dynamically but also released from the setting dynamically.

In addition, the computer system may comprise: a register for regulating the range of the second memory area set by the special memory area setting unit; and access inhibiting means for inhibiting access to the second memory area set by the special memory area setting unit for purposes other than CPU command conversion or real-time compilation.

Figure 11:
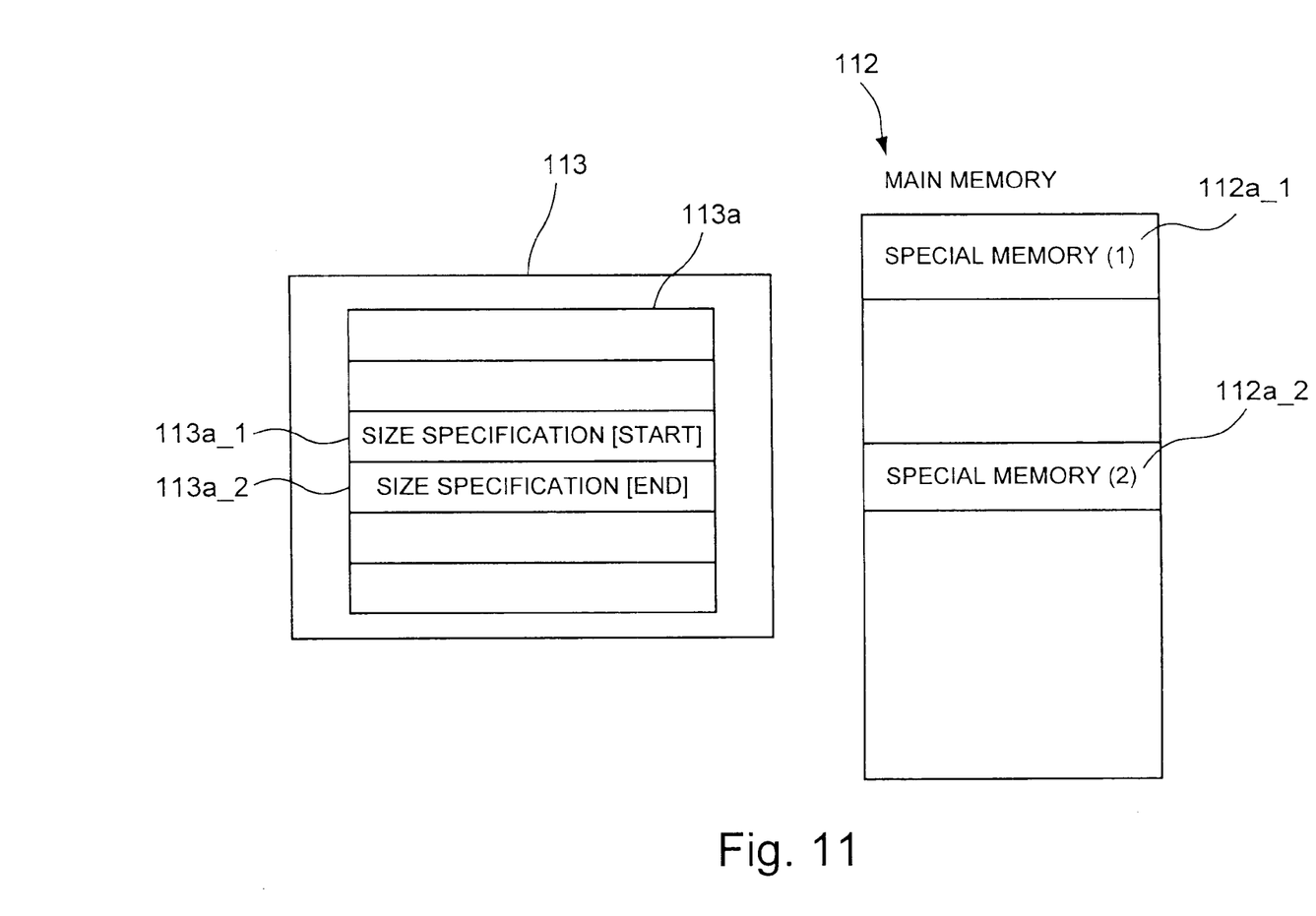
FIG. 11 is a view showing a register for regulating a range of the second special memory area.

FIG. 11 shows the register for regulating the range of the second special memory area.

As shown in FIG. 11, the memory controller 113 is provided with a memory controller register 113a for regulating the range of the second special memory area 112a_2 set by the special memory area setting unit. Thus, the access inhibiting means is formed to inhibit access to the second special memory area 112a_2 for purposes other than CPU command conversion or real-time compilation. That is, in the memory controller register 113a, size specification [start] 113a_1 for specifying a starting address of the second special memory area 112a_2, and size specification [End] 113a_2 for specifying an end address of the special memory area 112a_2 are set. As a result, a function for inhibiting access to the second special memory area 112a_2 is provided.

Furthermore, in each of the embodiments, the special memory area setting unit may obtain a part of the memory area used by the operating system or the application program, and assigns it as a special memory area.

As described above, the computer system of the present invention for operating a part of the memory as the special memory area for CPU command conversion or real-time compilation is provided with the special memory area setting unit. Thus, it is possible to realize a computer system capable of freely setting a capacity of the special memory area, and operated with excellent performance for CPU command conversion or real-time compilation.

What is claimed is:

1. A computer system having a CPU and a memory controller to control allocation of memory in the computer system, the memory controller allocating a part of the memory as a special memory area for CPU command conversion or real-time compilation, comprising:

a special memory setting table indicating respective special memory capacity setting values for a plurality of memory capacities of memory mountable in the computer system; and a special memory area setting unit to read a capacity setting value for a special memory area corresponding to a memory capacity of memory mounted in the computer system from said special memory setting table at a starting time of the computer system, and then allocating in the mounted memory a special memory area based on the capacity setting value.

2. A computer system according to claim 1, further comprising:

another special memory area allocated from the memory, in addition to the special memory area used in a fixed manner, the other special memory being allocatable as a special memory area, or released from the allocation as a special memory area, wherein said special memory area setting unit allocates the other special memory area as a special memory area, or releases the special memory allocation.

3. A computer system according to claim 2, further comprising:

a register for regulating a capacity range of the other special memory area allocated by said special memory area setting unit; and an access inhibiting unit to inhibit access to the other special memory area for purposes other than CPU command conversion or real-time compilation.

4. A computer system according to claim 1, wherein said special memory area setting unit obtains a part of a memory area used by an operating system or an application program, and allocates the obtained part as part of the special memory area.

5. A computer system having a CPU and a memory controller to control allocation of memory in the computer system, the memory controller allocating a part of the memory as a special memory area for CPU command conversion or real-time compilation, comprising:

a calculating formula storage unit to store a formula to calculate a capacity of the special memory area corresponding to a capacity of memory mounted in the computer system; and a special memory area setting unit to allocate a part of the mounted memory as a special memory area of the computer system based on the formula stored in the calculating formula storage unit at a starting time of the computer system.

6. A computer system having a CPU and a memory controller to control allocation of memory, the memory controller allocating a part of the memory as a special memory area for CPU command conversion or real-time compilation, comprising:

a special memory area setting unit including a software interface to set a capacity setting value of the special memory area, indicating a capacity of the special memory, based on an operation executed by an operator.

7. A computer system having a CPU and a memory controller to control allocation of memory, the memory controller allocating a part of the memory as a special memory area for CPU command conversion or real-time compilation, comprising:

a memory use state monitoring unit to monitor an amount of use of the memory by a user using the computer system; and a special memory area setting unit to set a capacity of the special memory area based on a monitoring result of the memory use amount by said memory use state monitoring unit.

* * * * *